May 13, 1952     L. O. HARBOUR     2,596,771
BUSHING AND BEARING SPACER ASSEMBLY FOR ROLLER SKATE WHEELS
Filed Dec. 10, 1948
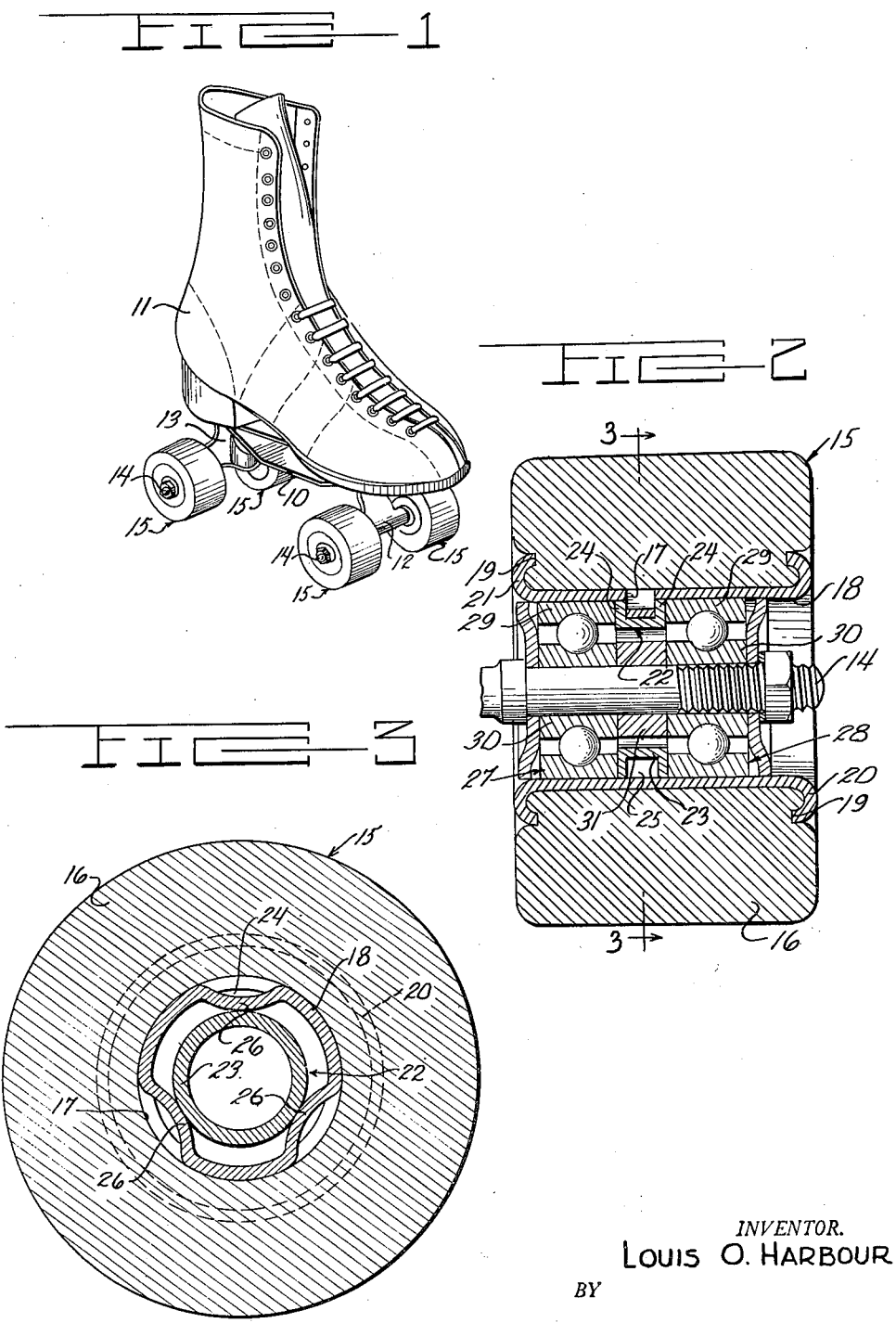
INVENTOR.
LOUIS O. HARBOUR
BY
McMorrow, Berman + Davidson
ATTORNEYS Patented May 13, 1952

2,596,771

UNITED STATES PATENT OFFICE 2,596,771

BUSHING AND BEARING SPACER ASSEMBLY
FOR ROLLER SKATE WHEELS

Louis O. Harbour, Royal Oak, Mich.

Application December 10, 1948, Serial No. 64,622

8 Claims. (Cl. 301—5.7)

Roller skate wheels, particularly wheels of the type for indoor use, comprise a tire of cylindrical form usually made of hard maple wood or the like, and/or of plastic material. Such tires are usually mounted on a sleeve or bushing of metal concentrically of the sleeve, and such bushing usually includes a radially inwardly-directed annular rib comprising a spacer rib for a pair of ball bearing assemblies, whereby the wheel is mounted on a skate axle. In such wheels, particularly those made of wood, if a radial crack occurs through the tire, the tire will break up and fly off of the sleeve or bushing whereby the skater is likely to incur a bad fall. Also, in such wheels, wherein the bushing and spacer rib mount a pair of precision ball bearing assemblies, it is extremely difficult to obtain perfect alignment of the bearing assemblies whereby binding of the bearings occurs in use. Also, in such wheels, difficulty is found in preventing side play of the two ball bearing assemblies.

With the foregoing in view, it is an object of my invention to provide an improved bushing and bearing spacer rib assembly.

A further object is to provide a novel method of making a bushing and bearing spacer rib assembly according to the invention.

A further object is to provide an improved bushing and bearing spacer rib assembly and/or an improved method of making the same, wherein the bushing and rib are made as separate pieces and wherein the rib and bushing are formed with interengaging portions adapted to rigidly connect the two together in assembled relation.

A still further object of the invention is to provide an end clinch for the wheel tires that will prevent the tire from breaking up and flying off the bushing of the hub unit in the event a radial crack occurs in the tire.

Other objects and advantages reside in the particular structure of the invention, combination and arrangement of the several parts thereof, and will be readily understood by those skilled in the art upon reference to the attached drawing in connection with the following specification, wherein the invention is shown, described and claimed.

In the drawing:

Figure 1 is a perspective view of a shoe skate having the device of the invention applied to the wheels thereof;

Figure 2 is a longitudinal vertical sectional view taken substantially diametrically through a skate wheel including the invention;

Figure 3 is a transverse vertical sectional view taken substantially on the plane of the line 3—3 of Figure 2.

Referring specifically to the drawing, wherein like reference characters have been used throughout the several views to designate like parts, 10 designates generally a shoe skate including any suitable means, not shown, for attaching the same to a skate shoe 11. The skate 10 includes front and rear trucks 12 and 13, each of which mounts a fixed axle 14 extending laterally of opposite sides of each truck. As so far described, the structure is conventional and forms no part of my invention.

Each end of each axle 14 has mounted thereon for rotation relative thereto a skate wheel generally indicated at 15. Inasmuch as the wheels 15 are identical, it will suffice to describe but a single one of them. Each wheel 15 comprises a cylindrical tire 16 which may be formed of wood or plastic and which is provided with an axial bore 17 of considerably larger size than the axle 14. The hub unit according to the invention comprises a bushing 18 in the form of a hollow cylindrical sleeve formed of any suitable deformable metallic material. The sleeve 18 is adapted to have a close fit in the bore 17 of the tire and may be secured therein in any suitable manner. The respective end faces of the tire are provided with annular grooves 19, forming axially projecting shoulders around the bore 17. The end flanges 20 and 21 of the bushing or body 18 are turned radially outwardly and then turned and compressed axially toward each other against the wheel body, in compressive, retaining, engagement over and with the annular shoulders of the wheel body to clinch the tire 16 securely on the bushing or body.

However, prior to the connection of the sleeve 18 to the tire 16, the bearing spacer rib according to the invention is secured thereto. Such rib is generally indicated at 22 and is of channel configuration in cross-section. Thus, the rib 22 includes an annular web 23 having a pair of laterally-spaced and radially outwardly-directed flanges 24 formed integrally of opposite side edges thereof. The web 23 and flanges 24 define a radially outwardly-directed channel 25 therebetween. The free marginal edges of the flanges 24 are squared and have a close sliding fit in the sleeve 18. To connect the rib 22 to the sleeve 18, an annular section of the sleeve 18 overlying the channel 25 is formed with a plurality of integral tongues 26 which are radially inwardly directed into the channel 25 so as to frictionally engage the inner surfaces of the flanges 24 and/or the web 23, whereby to rigidly connect the sleeve 18 and rib 22 together as a unit. In practice, it is preferred that the tongues 26 be simultaneously formed and radially upset by any suitable tool whereby to utilize the sharp inner free edges of the flanges 24 as dies to form parallel slits in the stock of the sleeve 18. This method of forming and upsetting the tongues 26 ensures that the side edges of such tongues will have a tight frictional fit with the inner surfaces of the flanges 24.

It should be noted, Figure 2, that the rib 22 is located in off-center relation to the tire 16 whereby to locate any suitable ball bearing assemblies 27 and 28 in off-center relation so as to provide means for preventing rubbing of the wheels 15 against the trucks 12 and 13 in use.

Bearing assemblies 27 and 28, as shown, are of the precision type and include outer races 29 bearing against opposite sides of the rib 22 and inner races 30 bearing against a spacer 31 on axle 14. The bearing assemblies and wheel are secured in position on axle 14 by the usual nut, lock washers and dust washers.

While I have shown and described what is now thought to be a preferred embodiment of the invention and a preferred method of making the same, it is to be understood that the same is susceptible of other forms and expressions and other methods of manufacture. Consequently, I do not limit myself to the precise structure and method shown and described hereinabove except as hereinafter claimed.

I claim:

1. In a roller skate wheel including an annular tire, the improvement comprising a bushing and bearing spacing rib assembly for said tire, said rib comprising an annulus of channeled configuration and including an annular web and a pair of laterally-spaced annular flanges extending radially outwardly of opposite sides of said web to provide a radially outwardly-directed channel, said bushing comprising a cylindrical metal sleeve having a close sliding fit on said rib concentrically thereof to provide an annular section spanning said channel, portions of said section being radially inwardly directed into said channel to connect said rib and bushing rigidly together, and said sleeve having opposite ends formed with radially outwardly-directed portions adapted to engage opposite sides of said tire to mount said assembly therein axially thereof.

2. In a roller skate wheel including an annular tire, the improvement comprising a bushing and bearing spacing rib assembly for said tire, said rib comprising an annulus of channeled configuration and including an annular web and a pair of laterally-spaced annular flanges extending radially outwardly of opposite sides of said web to provide a radially outwardly-directed channel, said bushing comprising a cylindrical metal sleeve having a close sliding fit on said rib concentrically thereof to provide an annular section spanning said channel, circumferentially-spaced portions of said section being radially inwardly directed into said channel and into engagement with said web whereby to connect said rib and bushing rigidly together, and said sleeve including means for rigidly connecting the same to said tire axially thereof.

3. In a roller skate wheel including an annular tire, the improvement comprising a bushing and bearing spacing rib assembly for said tire, said rib comprising an annulus of channeled configuration and including an annular web and a pair of laterally-spaced annular flanges extending radially outwardly of opposite sides of said web to provide a radially outwardly-directed channel, said bushing comprising a cylindrical metal sleeve having a close sliding fit on said rib concentrically thereof to provide an annular section spanning said channel, circumferentially-spaced portions of said section being radially inwardly directed into said channel and into engagement with said flanges whereby to connect said rib and bushing rigidly together, and said sleeve including means for rigidly connecting the same to said tire axially thereof.

4. In a roller skate wheel including an annular tire the improvement comprising a bushing and bearing spacing rib assembly for said tire, said rib comprising an annulus of channeled configuration and including an annular web and a pair of laterally-spaced annular flanges extending radially outwardly of opposite sides of said web to provide a radially outwardly-directed channel, said bushing comprising a cylindrical metal sleeve having a close sliding fit on said rib concentrically thereof to provide an annular section spanning said channel, circumferentially-spaced portions of said section being radially inwardly directed into said channel and into engagement with said flanges and web whereby to connect said rib and bushing rigidly together, and said sleeve including means for rigidly connecting the same to said tire axially thereof.

5. In a roller skate wheel including an annular tire, the improvement comprising a bushing and bearing spacing rib assembly for said tire, said rib comprising an annulus of channeled configuration and including an annular web and a pair of laterally-spaced annular flanges extending radially outwardly of opposite sides of said web to provide a radially outwardly-directed channel, said bushing comprising a cylindrical metal sleeve having a close sliding fit on said rib concentrically thereof to provide an annular section spanning said channel, portions of said section being radially inwardly directed into said channel to connect said rib and bushing rigidly together, said sleeve having opposite ends formed with radially outwardly-directed portions adapted to engage opposite sides of said tire to mount said assembly therein axially thereof, and said rib being located nearer one end of said sleeve than the other.

6. In a roller skate wheel including an annular tire, the improvement comprising a bushing and bearing spacing rib assembly for said tire, said rib comprising an annulus of channeled configuration and including an annular web and a pair of laterally-spaced annular flanges extending radially outwardly of opposite sides of said web to provide a radially outwardly-directed channel, said bushing comprising a cylindrical metal sleeve having a close sliding fit on said rib concentrically thereof to provide an annular section spanning said channel, said section being formed with a circumferential series of laterally-spaced pairs of parallel slits, each pair of slits defining an integral tongue, and said tongues being radially inwardly directed into said channel to provide means for rigidly connecting said rib and bushing together, and said sleeve being formed with means for connecting said assembly to said tire axially thereof.

7. In a roller skate wheel, in combination, a wheel body of wood having a concentric bore and annular, axially projecting shoulders in the respective end faces of the body around the bore, and a hub unit comprising a seamless tubular metal body inserted in said bore in substantially conforming fit therewith and having annular end flanges integral with said metal body, turned outwardly and turned and compressed toward each other against the wheel body, in compressive, retaining engagement over and with said annular shoulders of the wheel body, said tubular hub body having a plurality of pairs of transverse slits disposed in an annular row intermediate the ends of the body, and inwardly extending lugs formed by the material of the body between the respective pairs of slits, said lugs projecting inwardly in said tubular body to constitute annularly disposed retaining structure therein.

8. In a roller skate wheel, in combination, a wheel body of wood having a central bore and annular, axially projecting shoulders in the respective end faces of the body around the bore, and a hub unit comprising a unitary tubular metal body inserted in said bore in conforming fit therewith and having annular end flanges integral with said metal body, turned radially outwardly and then turned and compressed axially toward each other against the wheel body, in compressive, retaining engagement over and with said annular shoulders of the wheel body, and an annularly disposed retaining and spacing structure in the rigid with said tubular metal body, intermediate the ends thereof, for locating anti-friction bearing assemblies, said hub unit being so constructed and arranged as to snugly receive anti-friction bearing assemblies at opposite sides of the retaining and spacing structure.

LOUIS O. HARBOUR.

REFERENCES CITED

The following references are of record in the file of this patent:

UNITED STATES PATENTS

| Number | Name | Date |
|---|---|---|
| 294,461 | Gendron | Mar. 4, 1884 |
| 1,084,409 | Divine | Jan. 13, 1914 |
| 1,773,924 | Merrill | Aug. 26, 1930 |
| 1,903,776 | Clark | Apr. 18, 1933 |
| 2,209,181 | Wendel | July 23, 1940 |
| 2,304,944 | Martinec | Dec. 15, 1942 |
| 2,316,498 | Biczak | Apr. 13, 1943 |
| 2,432,105 | Wagner | Dec. 9, 1947 |

FOREIGN PATENTS

| Number | Country | Date |
|---|---|---|
| 7,635 | Great Britain | A. D. 1910 |
| 14,624 | Great Britain | June 22, 1909 |
| 15,216 | Great Britain | June 29, 1909 |